UNITED STATES PATENT OFFICE.

RICHARD HERZ, OF FRANKFORT-ON-THE-MAIN, GERMANY, ASSIGNOR TO LEOPOLD CASSELLA & CO., OF FRANKFORT-ON-THE-MAIN, GERMANY.

BLUE SULFUR DYE AND PROCESS OF MAKING SAME.

SPECIFICATION forming part of Letters Patent No. 742,189, dated October 27, 1903.

Application filed April 17, 1903. Serial No. 153,127. (Specimens.)

*To all whom it may concern:*

Be it known that I, RICHARD HERZ, a citizen of Prussia, and a resident of Frankfort-on-the-Main, in the Province of Hesse-Nassau, Prussia, Germany, have invented certain new and useful Improvements in Blue Sulfur Dye and Processes of Making Same, of which the following is a specification.

In the United States Letters Patent, No. 709,151, September 16, 1902, I have described a process of producing a blue dyestuff from para amidotolyl para oxyphenylamin. I have now discovered that a dyestuff of similar properties, but of a considerably greener shade, is obtained if one atom of chlorin is introduced into the ortho position to the hydroxyl group of the said para amidotolyl para oxyphenylamin. This hitherto unknown para amidotolyl para oxychlorphenylamin of the following constitution

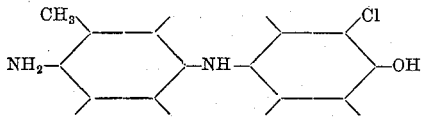

may be obtained by reducing the product of simultaneous oxidation of equimolecular proportions of chlor para amidophenol (Kohlrepp, *Liebig's Annalen*, Vol. 234, page 5) and orthotoluidin.

Example: 14.4 kilos chlor para amidophenol and 10.7 kilos orthotoluidin are dissolved in two hundred liters water and thirty-one kilos sulfuric acid, (66° Baumé.) The solution is well cooled with ice and quickly mixed with a solution of twenty kilos bichromate of soda and two hundred liters water. A concentrated solution of seventy-five kilos sodium sulfid is at once added and the whole heated by means of direct steam from 85° to 90° centigrade. The para amidotolyl para oxychlorphenylamin goes into solution, whereas the chromium hydrate remains undissolved. The hot solution is filtered and the base separated from the cooled filtrate by the addition of bicarbonate of soda. The separation may be completed by saturation with common salt. In order to purify the product thus obtained, it is dissolved in dilute hydrochloric acid and precipitated from the filtered solution by the addition of carbonate of soda. The thus-obtained base is difficultly soluble in water and more easily soluble in organic solvents. It forms salts with mineral acids as well as with caustic alkalies, which all are easily soluble in water. Alkaline solutions are rapidly oxidized by the oxygen of the air. By crystallization from diluted alcohol the free base is obtained in form of colorless needles showing a melting-point of 185° centigrade.

In order to transform the amidotolyloxychlorphenylamin into a blue sulfur dyestuff, I proceed, for instance, as follows:

Example: One hundred kilos crystallized sodium sulfid and fifty kilos sulfur are melted together in an iron vessel, and as soon as the sulfur is dissolved twenty-five kilos amidotolyloxychlorphenylamin are introduced at a temperature of 80° to 100° centigrade. The temperature is then raised to about 115° centigrade and maintained during twenty-four hours. The melt is dissolved in water, the solution is filtered, and the dyestuff is precipitated by introducing a current of air. The thus-produced dyestuff is easily soluble in water in presence of sodium sulfid with a blue color and dyes direct greenish-blue indigo shades on unmordanted cotton, which are fast to washing, acids, and light. By modifying the conditions of melting the shade of the coloring-matters may be varied. At higher temperatures dyestuffs of a more greenish and duller shade are obtained, while at lower temperatures or if working in an alcoholic solution more reddish and brighter shades. The general properties of the dyestuffs, however, remain essentially the same.

Having thus described my invention and in what manner the same can be performed, what I claim is—

1. The process of producing blue cotton-dyestuffs by heating para amidotolyl para oxychlorphenylamin with polysulfids substantially as described.

2. The blue sulfur dye obtained from para amidotolyl para oxychlorphenylamin, which is a dark-blue powder nearly insoluble in pure water or alcohol, easily soluble with a dark blue color in concentrated sulfuric acid, easily soluble in water in presence of alkaline sulfids and dyeing unmordanted cotton from such a solution greenish indigo shades fast to washing, acids and light substantially as described.

Signed at Frankfort-on-the-Main, in the Province of Hesse-Nassau and Kingdom of Prussia, this 2d day of April, A. D. 1903.

RICHARD HERZ.

Witnesses:
JEAN GRUND,
CARL GRUND.